United States Patent [19]

Müller et al.

[11] Patent Number: 4,544,683
[45] Date of Patent: Oct. 1, 1985

[54] INORGANIC-ORGANIC FIXED-DRESSINGS AND A PROCESS FOR THEIR PRODUCTION

[75] Inventors: Peter Müller, Odenthal; Kuno Wagner, Leverkusen; Christian Wegner, Cologne; Peter Schwabe, Leverkusen, all of Fed. Rep. of Germany

[73] Assignee: Bayer Aktiengesellschaft, Leverkusen, Fed. Rep. of Germany

[21] Appl. No.: 611,792

[22] Filed: May 18, 1984

[30] Foreign Application Priority Data

Jun. 3, 1983 [DE] Fed. Rep. of Germany ....... 3320217

[51] Int. Cl.$^4$ .................. C08K 3/30; A61F 13/04; A61K 6/02; C08L 75/04
[52] U.S. Cl. .................. 523/111; 523/113; 523/222; 524/4
[58] Field of Search .............. 523/111, 113, 222; 524/4

[56] References Cited

U.S. PATENT DOCUMENTS

| | | | |
|---|---|---|---|
| 3,333,974 | 8/1967 | Sherr | 106/109 |
| 3,479,310 | 11/1969 | Dieterich et al. | 525/443 |
| 3,756,992 | 9/1973 | Dieterich | 525/440 |
| 3,832,220 | 8/1974 | Plumb | 521/55 |
| 3,905,929 | 9/1975 | Noll | 525/127 |
| 3,920,598 | 11/1975 | Reiff et al. | 524/871 |
| 4,108,814 | 8/1978 | Reiff et al. | 524/840 |
| 4,127,548 | 11/1978 | Alexander | 524/4 |
| 4,139,674 | 2/1979 | Mueller et al. | 528/64 |
| 4,166,149 | 8/1979 | Mueller et al. | 428/334 |
| 4,228,053 | 10/1980 | McLaughlin et al. | |
| 4,237,264 | 12/1980 | Noll et al. | 528/71 |
| 4,444,925 | 4/1984 | Feldman | 524/4 |

FOREIGN PATENT DOCUMENTS

| | | |
|---|---|---|
| 5902 | 12/1979 | European Patent Office |
| 2626431 | 12/1977 | Fed. Rep. of Germany |
| 2713984 | 10/1978 | Fed. Rep. of Germany |

OTHER PUBLICATIONS

Derwent Abstract 33541 C/19, (Mar. 1980), Tokiwa Kasci KK J55042281.
Derwent Abstract 69038 D/38, (Aug. 1981), Matsushita Elec. Works J56098273.
Derwent Abstract 22744 B/12, (Feb. 1979), Kao Soap J54018896.
Derwent Abstract 15085 A/08, (Jan. 1978), Sanyo KK J53003498.
Derwent Abstract 59291 A/33, (7-1978), Myojo Kogyo J53078226.
Chem. Abs. 81-28882k, (1974) Cherkinskii et al., Oct. 1973.
Derwent Abstract 39837 W/24, (4-1974) Kanebo KK Japan J49044026.
Chemical Abstracts, vol. 92, 2/1980, page 311; Chemical Abstracts, vol. 93, 1980 page 279 WO-A-8 000 705 Reuter Technologie, Summary (11 pages, both sides) Apr. 1980.

Primary Examiner—Herbert J. Lilling
Attorney, Agent, or Firm—Sprung Horn Kramer & Woods

[57] ABSTRACT

A process for producing an inorganic-organic composition material based on gypsum and polyurethane comprising exposing calcined gypsum or anhydrite to the action of water in the presence of a polyurethane or polyurethane-urea which is dispersible in water and in the presence of up to about 20% by weight (relative to the total mixture) of an alcohol and up to about 20% by weight (relative to the total mixture) of another organic solvent, and allowing the composition to set while permitting any solvents which may be present to evaporate. The calcium sulphate may be on a textile support or the composition may be molded into flexible shaped articles of good mechanical properties.

14 Claims, No Drawings

INORGANIC-ORGANIC FIXED-DRESSINGS AND A PROCESS FOR THEIR PRODUCTION

The present invention relates to novel inorganic-organic composite materials based on gypsum and polyurethane plastics and to a process for their production by setting calcined gypsum or anhydrite in the presence of aqueous dispersions of polyurethane(-urea)s and, where appropriate, alcohols. The new composite materials are particularly suitable for medical applications (for example fixed dressings and dental compositions) but they are also suitable for use in the building industry (for example joint sealing compositions, plastering materials and manufactured parts) or as molded articles for decoration.

Calcined gypsum is employed for a very wide variety of applications all over the world as a material which is set by water, for example in medicine in the form of fixed dressings to immobilize parts of the body or as a modelling composition. For these purposes, gypsum is employed either alone or on support fabrics. Calcined gypsum has the theoretical chemical composition $CaSO_4.0.5\ H_2O$ and, after impregnation with water, it is converted into the chemical composition $CaSO_4.2\ H_2O$ while setting. This set gypsum has serious disadvantages, for example for use in medicine. On the one hand, the water resistance of gypsum is deficient and, on the other hand, it is so hard and brittle that the fixed dressings or the models frequently break under mechanical stress. The necessity for repairs brought about by these two factors leads to high costs and prolonged durations of treatment. Thus, there has existed for some time the desire to improve the gypsum systems used in medicine in respect of their resistance to water and resistance to breakage.

In addition, all attempts to protect gypsum for use in the construction industry against the effect of water by impregnation with salt solutions, bitumens or plastic emulsions have hitherto been unsuccessful (compare in this context "Blick durch die Wirtschaft" of 13.9.82 No. 175, page 7). Thus, it was all the more surprising to find that it is possible to mix gypsum with aqueous dispersions of polyurethane(-urea)s, where appropriate with the addition of up to 20% by weight of alcohol, without previous coagulation of the dispersion, and that, after setting, it exhibits considerably improved properties in respect of resistance to water and resistance to breakage.

Accordingly, the present invention relates to a process for the production of a composite material comprising gypsum and polyurethane and/or polyurethane-urea, which is characterised in that anhydrite or calcined gypsum is exposed to the action of water in the presence of a polyurethane(-urea) which is dispersible in water and, where appropriate, in the presence of up to 20% by weight (relative to the total mixture) of an alcohol and, where appropriate, up to 20% by weight (relative to the total mixture) of other organic solvents, and the composition is allowed to set while the solvents (including volatile alcohols), which have also been used where appropriate, evaporate and, where appropriate, while molding.

The invention also relates to the inorganic-organic composite materials obtainable by the process according to the invention, the set composite material containing, as a rule, 1–50% by weight, preferably 5–45% by weight, particularly preferably 25–35% by weight, of polyurethane(-urea).

In the process according to the invention, the calcined gypsum is preferably exposed to the action of an aqueous dispersion of polyurethane(-urea) having a content of solids of 1–60% by weight, in particular 5–50% by weight. The total amount of water is, as a rule, 18–400% by weight, preferably 30–100% by weight, particularly preferably 35–70% by weight, relative to the calcined gypsum.

The polyurethane(-urea)s employed in the process according to the invention for improving the mechanical properties (in particular improving the elasticity and resistance to water; reducing the brittleness) of the gypsum contain hydrophilic groups which are chemically incorporated and ensure the dispersibility in water, specifically in the form of (a) ionic groups and/or (b) groups which can be converted into ionic groups by a neutralization reaction and/or (c) ethylene oxide units ($—CH_2—CH_2—O—$) within polyether chains incorporated in the polyurethane(-urea) molecule.

In principle, all aqueous dispersions of polyurethane(-urea)s which are known per se to form non-adhesive films on drying, and which, where appropriate, as a result of containing alcohols and, where appropriate, other organic solvents, are largely insensitive to coagulation by electrolytes, are suitable for the process according to the invention. As has emerged, the mechanical properties of the polyurethane(-urea), for example in respect of tensile strength and elongation at rupture, are also reflected by the properties of the said composite material.

A number of processes have been disclosed for the production of dispersions of polyurethane(-urea)s in water. For example, summaries are to be found by D. Dieterich and H. Reiff in "Die Angewandte Makromolekulare Chemie", 26, 1972, (pages 85–106), D. Dieterich et al. in "Angewandte Chemie", 82, 1970, (pages 53–63), D. Dieterich et al. in J. Oil Col. Chem. Assoc. 1970, 53, (363–379), D. Dieterich in "Die Angewandte Makromolekulare Chemie", 98, 1981 (pages 133–158) and in "Chemie und Technologie makromolekularer Stoffe" (The Chemistry and Technology of Macromolecular Materials) (29th publication of the Aachen Industrial College on the 9th Colloquium on the 8th May 1981 at the Aachen Industrial College, Faculty of Chemical Engineering). A comprehensive survey of the literature is also supplied in these reviews.

In the text which follows, unless expressly otherwise indicated, the term "polyurethane" is intended also to include polymers containing urea groups, that is to say polyurethane-ureas.

One of the processes for the production of aqueous dispersions of polyurethanes which is preferred in practice comprises reacting a NCO prepolymer, which is dissolved in an organic solvent, with a chain-lengthening agent. For this purpose, either the prepolymer or the chain-lengthening agent contains ionic groups or groups capable of forming ions. During the course of the polyaddition reaction or thereafter, these groups which are capable of forming ions are converted into ionic groups. At the same time or subsequently, the aqueous dispersion is produced by adding water and removing the organic solvent by distillation.

As already mentioned, it is possible to use not only cationic but also anionic and non-ionic dispersions of polyurethanes in the process according to the invention. Those types of aqueous dispersions of polyurethanes which, on drying, provide polyurethane films having elastic properties are preferably used according to the invention. These are to be understood to include, in particular, polyurethanes or polyureas or polyhydrazodicarboxamides which are rubber-elastic or at least tough in the notched bar test, and which have an indentation hardness below 1,400 kp/cm$^2$ (60 seconds by the method of DIN 53,456), and preferably a Shore hardness D of less than 98. Obviously, in the particular case, it is also possible to employ dispersions of more rigid polyurethanes for composite materials having special properties.

As explained above, aqueous dispersions of polyurethanes suitable for the process according to the invention can be obtained quite generally by also using, in the production of the polyurethanes, components which have ionic groups or groups which are capable of forming ions and also have at least one NCO group or at least one hydrogen atom which reacts with isocyanate groups. Examples of suitable compounds of this type are the following, where appropriate in mixtures, (see also U.S. Pat. Nos. 3,756,992, 3,479,310 or 4,108,814):

(1) Compounds which have tertiary amino groups which are basic, can be neutralized with aqueous acids or can be quaternized:

(a) Alcohols, in particular alkoxylated aliphatic, cycloaliphatic, aromatic and heterocyclic secondary amines, for example N,N-dimethylethanolamine, N,N-diethylethanolamine, N,N-dibutylethanolamine, 1-dimethylamino-2-propanol, N-melhyl-N-hydroxyethylaniline, N,N-methyl-β-hydroxypropylaniline, N,N-ethyl-β-hydroxyethylaniline, N,N-butyl-β-hydroxyethylaniline, N-hydroxyethylpiperidine, N-hydroxyethylmorpholine, α-hydroxyethylpyridine and γ-hydroxyethylquinoline.

(b) Diols and triols, in particular alkoxylated aliphatic, cycloaliphatic, aromatic and heterocyclic primary amines, for example N-methyldiethanolamine, N-butyldiethanolamine, N-oleyldiethanolamine, N-cyclohexyldiethanolamine, N-methyldiisopropanolamine, N-cyclohexyldiisopropanolamine, N,N-dioxyethylaniline, N,N-dioxyethyl-m-toluidine, N,N-dioxyethyl-p-toluidine, N,N-dioxypropylnaphthylamine, N,N-tetraoxyethyl-α-aminopyridine, dioxyethylpiperazine, polyoxyethylated butyldiethanolamine, polypropoxylated methyldiethanolamine (molecular weight 1,000), polypropoxylated methyldiethanolamine (molecular weight 2,000), polyesters with tert.amino groups, tri[2-hydroxy-1-propyl]amine, N,N-di-n-(2,3-dihydroxypropyl)aniline, N,N'-dimethyl-N,N'-bisoxyethylhydrazine and N,N'-dimethyl-N,N'-bisoxypropylethylenediamine.

(c) Aminoalcohols, for example by hydrogenation of products obtained from the addition of alkylene oxide and acrylonitrile onto primary amines, such as N-methyl-N-(3-aminopropyl)ethanolamine, N-N-cyclohexyl-N-(3-aminopropyl)-2-propanolamine, N,N-bis(3-aminopropyl)ethanolamine and N-3-aminopropyldiethanolamine.

(d) Amines, for example N,N-dimethylhydrazine, N,N-dimethylethylenediamine, 1-diethylamino-4-aminopentane, α-aminopyridine, 3-amino-N-ethylcarbazole, N,N-dimethylpropylenediamine, N-aminopropylpiperidine, N-aminopropylmorpholine, N-aminopropylethyleneimine and 1,3-bispiperidino-2-aminopropane.

(e) Diamines, triamines and amides, in particular by hydrogenation of products of addition of acrylonitrile onto primary or disecondary amines, for example bis(3-aminopropyl)methylamine, bis(3-aminopropyl)cyclohexylamine, bis(3-aminopropyl)aniline, bis(3-aminopropyl)toluidine, diaminocarbazole, bis(aminopropoxyethyl)butylamine, tris-(aminopropyl)amine or N,N'-biscarboxamidopropylhexamethylenediamine, and compounds obtainable by addition of acrylamide onto diamines or diols.

(2) Compounds which contain halogen atoms which are able to undergo quaternization reactions, or corresponding esters of strong acids: 2-chloroethanol, 2-bromoethanol, 4-chlorobutanol, 3-bromopropanol, β-chloroethylamine, 6-chlorohexylamine, ethanolamine sulphate, N,N-bishydroxyethyl-N'-m-chloromethylphenylurea, N-hydroxyethyl-N'-chlorohexylurea, glycerolaminochloroethylurethane, chloroacetalethylenediamine, bromoacetyldipropylenetriamine, trichloroacetyltriethylenetetramine, glycerol-α-bromohydrin, polypropoxylated glycerol-α-chlorohydrin, polyesters with aliphatically bonded halogen as 1,3-dichloro-2-propanol.

Appropriate isocyanates which may be mentioned are: chlorohexyl isocyanate, m-chlorophenyl isocyanate, p-chlorophenyl isocyanate, bischloromethyldiphenylmethane diisocyanate, 2,4-diisocyanatobenzyl chloride, 2,6-diisocyanatobenzyl chloride, N-(4-methyl-3-isocyanatophenyl)-β-bromomethylurethane.

(3) Compounds which have carboxylic acid or hydroxyl groups capable of forming salts:

(a) Hydroxy- and mercaptocarboxylic acids: glycolic acid, thioglycolic acid, lactic acid, trichlorolactic acid, malic acid, dioxymaleic acid, dioxyfumaric acid, tartaric acid, dioxytartaric acid, mucic acid, saccharic acid, citric acid, glycerol-boric acid, pentaerythritol-boric acid, mannitol-boric acid, salicylic acid, 2,6-dioxybenzoic acid, protocatechuic acid, α-resorcylic acid, β-resorcylic acid, hydroquinone-2,5-dicarboxylic acid, 4-hydroxyisophthalic acid, 4,6-dihydroxyisophthalic acid, oxyterephthalic acid, 5,6,7,8-tetrahydro-2-naphthol-3-carboxylic acid, 1-hydroxy-2-naphthoic acid, 2,8-dihydroxy-3-naphthoic acid, β-oxypropionic acid, m-oxybenzoic acid, pyrazolonecarboxylic acid, uric acid, barbituric acid, resols and other formaldehyde-phenol condensation products.

(b) Polycarboxylic acids: sulphodiacetic acid, nitrilotriacetic acid, ethylenediaminetetraacetic acid, diglycolic acid, thiodiglycolic acid, methylenebisthioglycolic acid, malonic acid, oxalic acid, succinic acid, glutaric acid, adipic acid, maleic acid, fumaric acid, gallic acid, phthalic acid, tetrachlorophthalic acid, isophthalic acid, terephthalic acid, napthalene-1,4,5,8-tetracarboxylic acid, o-tolylimidodiacetic acid, β-naphthylimidodiacetic acid, pyridinedicarboxylic acid and dithiodipropionic acid.

(c) Aminocarboxylic acids: oxaluric acid, anilinoacetic acid, 2-hydroxycarbazole-3-carboxylic acid, glycine, sarcosine, methionine, α-alanine, β-alanine, 6-aminocaproic acid, 6-benzoylamino-2-chlorocaproic acid, 4-aminobutyric acid, aspartic acid, glutamic acid, histidine, anthranilic acid, 2-ethylaminobenzoic acid, N-(2-carboxyphenyl)aminoacetic acid, 2-(3'-aminobenzenesulphonylamino)benzoic acid, 3-aminobenzoic acid, 4-aminobenzoic acid, N-phenylaminoacetic acid, 3,4-diaminobenzoic acid, 5-aminobenzenedicarboxylic acid and 5-(4'-aminobenzoylamino)-2-aminobenzoic acid.

(d) Hydroxy- and carboxysulphonic acids: 2-hydroxyethanesulphonic acid, phenol-2-sulphonic acid, phenol-3-sulphonic acid, phenol-4-sulphonic acid, phenol-2,4-disulphonic acid, sulphoacetic acid, m-sulphobenzoic acid, p-sulphobenzoic acid, benzene-1-carboxylic-3,5-disulphonic acid, 2-chlorobenzene-1-carboxylic-4-sulphonic acid, 2-hydroxybenzene-1-carboxylic-5-sulphonic acid, 1-naphtholsulphonic acid, 1-naphtholdisulphonic acid, 8-chloro-1-naphtholdisulphonic acid, 1-naphtholtrisulphonic acid, 2-naphthol-1-sulphonic acid, 2-naphtholtrisulphonic acid, 1,7-dihydroxynaphthalene-3-sulphonic acid, 1,8-dihydroxynaphthalene-2,4-disulphonic acid, chromotropic acid, 2-hydroxynaphthalene-3-carboxylic-6-sulphonic acid and 2-hydroxycarbazole-7-sulphonic acid.

(e) Aminosulphonic acids: amidosulphonic acid, hydroxylaminemonosulphonic acid, hydrazinedisulphonic acid, sulphanilic acid, N-phenylaminomethanesulphonic acid, 4,6-dichloroaniline-2-sulphonic acid, 1,3-phenylenediamine-4,6-disulphonic acid, N-acetyl-1-naphthylamine-3-sulphonic acid, 1-naphthylaminesulphonic acid, 2-naphthylaminesulphonic acid, naphthylaminedisulphonic acid, naphthylaminetrisulphonic acid, 4,4'-di(p-aminobenzoylamino)diphenylurea-3,3'-disulphonic acid, phenylhydrazine-2,5-disulphonic acid, 2,3-dimethyl-4-aminoazobenzene-4',5-disulphonic acid, 4-azo-4-anisolyl-4'-aminostilbene-2,2'-disulphonic acid, carbazole-2,7-disulphonic acid, taurine, methyltaurine, butyltaurine, 3-aminobenzene-1-carboxylic-5-sulphonic acid, 3-aminotoluene-N-methanesulphonic acid, 6-nitro-1,3-dimethylbenzene-4-sulphamic acid, 4,6-diaminobenzene-1,3-disulphonic acid, 2,4-diaminotoluene-5-sulphonic acid, 4,4'-diaminodiphenyl-2,2'-disulphonic acid, 2-aminophenol-4-sulphonic acid, 4,4'-diaminodiphenyl ether 2-sulphonic acid, 2-aminoanisole-N-methanesulphonic acid and 2-aminodiphenylaminesulphonic acid.

Suitable salt-forming agents for group 1 are inorganic and organic acids and compounds having reactive halogen atoms and corresponding esters of strong acids. Some examples of these types of compounds are as follows: hydrochloric acid, nitric acid, hypophosphorous acid, amidosulphonic acid, hydroxylaminemonosulphonic acid, formic acid, acetic acid, glycolic acid, lactic acid, chloroacetic acid, ethyl bromoacetate, sorbitol-boric acid, methyl chloride, butyl bromide, dimethyl sulphate, diethyl sulphate, benzyl chloride, methyl p-toluenesulphonate, methyl bromide, ethylene chlorohydrin, ethylene bromohydrin, glycerol-α-bromohydrin, chloroacetic ester, chloroacetamide, bromoacetamide, dibromoethane, chlorobromobutane, dibromobutane, ethylene oxide, propylene oxide and 2,3-epoxypropanol.

The compounds of group 2 can form quaternary or ternary compounds with tertiary amines or with sulphides or phosphines. Then quaternary ammonium and phosphonium or ternary sulphonium salts are produced.

Examples of these are, inter alia, trimethylamine, triethylamine, tributylamine, pyridine, triethanolamine and the compounds listed under group (1a) and (1b), but also dimethyl sulphide, diethyl sulphide, thiodiglycol, thiodiglycolic acid, trialkylphosphines, alkylarylphosphines and triarylphosphines.

Inorganic and organic bases are suitable as salt-formers for the compounds of group 3, for example sodium hydroxide, potassium hydroxide, potassium carbonate, sodium bicarbonate, ammonia and primary, secondary and tertiary amines. Finally, it may be mentioned that organic phosphorus compounds are also suitable as compounds capable of forming salts, and in fact not only basic phosphines which can be incorporated, such as, for example, diethyl-β-hydroxyethylphosphine, methylbis-β-hydroxyethylphosphine and tris-β-hydroxymethylphosphine, but also derivatives of, for example, phosphinic acids, phosphonous acids and phosphonic acids, and esters of phosphorous and phosphoric acid as well as their thio analogues, for example bis(α-hydroxyisopropyl)phosphinic acid, hydroxyalkanephosphonic acid or phosphoric bisglycol ester.

Cationic polyurethanes suitable according to the invention are obtained by the method in, for example, DAS (German Published Specification) No. 1,270,276 by also using in the structure of the polyurethane at least one component having one or more basic tertiary nitrogen atoms, and reacting the basic tertiary nitrogen atoms in the polyurethane with alkylating agents or inorganic or organic acids. In this context, the location of the basic nitrogen atoms within the polyurethane macromolecule is in principle immaterial.

Conversely, it is also possible to react polyurethanes having reactive halogen atoms capable of quaternization with tertiary amines. In addition, cationic polyurethanes can also be prepared with chain-building quaternization by, for example, preparing dihalogenourethanes from, where appropriate, relatively high molecular weight diols and isocyanates with reactive halogen atoms or diisocyanates and halogenoalcohols, and reacting the dihalogenourethanes with ditertiary amines. Conversely, it is possible to prepare ditertiary diaminourethanes from compounds with two isocyanate groups and tertiary aminoalcohols, and to react them with reactive dihalogeno compounds. Obviously, the cationic polyurethane composition can also be prepared from a cationic salt-like starting component, such as a quaternized basic polyether or an isocyanate containing a quaternary nitrogen. These methods of preparation are described in, for example, German Auslegeschriften (German Published Specifications) Nos. 1,184,946, 1,178,586 and 1,179,363, U.S. Pat. No. 3,686,108 and Belgian Patent Specifications Nos. 653,223, 658,026 and 636,799. In addition, the starting materials suitable for constructing the salt-like polyurethanes are also listed in these sources.

The preparation of dispersions of anionic polyurethanes can likewise be carried out by processes known per se. Suitable anionic polyurethanes are described in, for example, DAS (German Published Specification) No. 1,237,306, DOS (German Published Specification) Nos. 1,570,565, 1,720,639 and 1,495,847. The starting compounds which are preferably employed in these processes are those which have carboxyl or sulphonate groups as the ionic groups.

In the preparation of the anionic dispersions, it is also possible to start from polyurethanes having free hydroxyl and/or amino groups and to react these with aliphatic or aromatic aldehydes and, at the same time or subsequently, with a metal sulphite, metal bisulphite, metal aminocarboxylate or metal aminosulphate. Finally, another possibility comprises reacting polyurethanes having free hydroxyl and/or amino groups with cyclic compounds having 3–7 ring members and salt-like groups or groups which are capable of forming salts after ring opening (see DAS (German Published Specification) No. 1,237,306). These include, in particular, sultones, such as 1,3-propanesultone, 1,4-butanesultone or 1,8-naphthosultone, and lactones, such as β-propiolactone or γbutyrolactone, and dicarboxylic anhydrides, for example succinic anhydride.

Cationic or anionic polyurethanes suitable for the process according to the invention can also be built up via formaldehyde polycondensation by the method in DAS (German Published Specification) No. 1,770,068. This entails reacting relatively high molecular weight polyisocyanates with an excess of compounds having terminal methylol groups (for example amine-formaldehyde resins or phenol-formaldehyde resins), dispersing the reaction products having methylol groups in water and finally crosslinking by heat treatment with the formation of methylene bridges.

It is also possible, but less preferable, to employ products as are described in German Offenlegungsschriften (German Published Specifications) Nos. 1,953,345, 1,953,348 and 1,953,349 in the process according to the invention. These are aqueous dispersions of ionic emulsion polymers which have been prepared by radical emulsion polymerization of olefinic unsaturated monomers in the presence of cationic or anionic oligourethanes or polyurethanes.

It is also possible according to the invention (but likewise less preferable) to employ sedimenting, but redispersible, aqueous dispersions of cationic or anionic polyurethanes which are chemically crosslinked.

The preparation of this type of crosslinked polyurethane particles can take place by a variety of methods which are known in principle to the expert. In general, crosslinked polyurethane particles can be prepared either as a suspension in suitable organic solvents or in water with the assistance of a liquid medium. In addition, it is possible within the scope of each of these processes, by choice of suitable reaction components, to obtain crosslinked particles directly or to prepare initially thermoplastic particles which have a predominantly linear structure and then to crosslink them.

For the preparation of a suspension in an organic medium, generally a type of solvent is selected in which one or even several of the reactants in fact dissolve but the high molecular weight reaction product does not. During the course of the reaction in this type of medium, the initially formed solution gradually becomes a suspension, this process advantageously being assisted by stirring. It is essential that the crosslinking process does not start until the disperse phase has been produced, since otherwise a gel forms. It is also possible to use those types of solvents which dissolve the polyurethane, which is not as yet crosslinked but is already of high molecular weight, at elevated temperature but not at room temperature. The suspension can then be obtained from the solution by cooling while stirring. The same effect can also be achieved by addition of a non-solvent, but the non-solvent should be miscible with the solvent. The production of a disperse phase having a desired particle size can be affected by the addition of suitable dispersants.

A large number of processes are known for the preparation of finely divided polyurethanes in aqueous media. Thus, for example, it is possible to disperse the solution of a polyurethane in a solvent which is immiscible with water, also using an emulsifier, and to remove the organic solvent by distillation. A particularly preferred method comprises mixing polyurethanes, which have been ionically and/or hydrophilically modified, with water with or without a solvent, polyurethane suspensions being formed as a function of the constitution and the reaction conditions. A very particularly preferred variant of this process comprises employing polyurethane prepolymers with terminal isocyanate or methylol groups, it being possible to use solutions of very high percentage concentration or even to work entirely without solvent. The coarse emulsions which are initially formed become high molecular weight polyurethane-urea suspensions by reaction of the isocyanate groups with water or diamines or polyamines dissolved in the aqueous phase, with chain-lengthening and crosslinking. The chain-lengthening of prepolymers containing methylol groups can be achieved by, for example, heating or lowering the pH.

Suitable suspensions can also be prepared by injecting high molecular weight polyurethanes or their reactive precursors into water or organic non-solvents.

In principle, all methods proposed for the production of dispersions of polyurethanes or of latices are also suitable for the production of suspensions of polyurethanes, as long as care is taken that these suspensions do not coalesce due to sedimentation or shear forces. This means that a primary suspension which has not yet reached a sufficiently high molecular weight should be kept in motion until the dispersed particles have become nonadhesive. To crosslink the dispersed particles, it is possible either to start with starting materials which are more than bifunctional, that is to say, for example, to use (also) branched polyesters or polyethers, triisocyanates or triols in building up the polyurethane, or to react a NCO prepolymer which is initially linear, that is to say prepared from bifunctional components, with amines of a higher functionality to give a crosslinked polyurethaneurea. However, it is also possible to build up crosslinked particles from purely bifunctional components by working under conditions which bring about branching, for example by the addition of catalysts which favor isocyanate trimerization or the formation of allophanate or biuret structures. In the presence of water and/or diamines, the use of amounts of isocyanate which are more than equivalent compared with the hydroxyl or amine compounds which are present frequently even by itself leads to crosslinking.

It is also possible subsequently to crosslink linear high molecular weight polyurethanes in the form of a suspension in a liquid medium by, for example, treatment with polyisocyanates or formaldehyde or compounds which split off formaldehyde. Products which contain basic groups can be crosslinked with, for example, polyfunctional quaternizing agents or acids, and products which contain acidic groups can be crosslinked with metal oxides or polyamines. Radical formers which are known per se or sulphur, polymercaptans and other agents which are capable of reacting with double bonds and are at least bifunctional, for example, are suitable for crosslinking polyurethanes which contain unsaturated double bonds.

Detailed descriptions of the production of crosslinked ionic polyurethane suspensions are to be found in, for example, German Auslegeschriften (German Published Specifications) Nos. 1,495,745 (U.S. Pat. No. 3,479,310), 1,282,962 (Canadian Pat. No. 837,174) and 1,694,129 (British Pat. No. 1,158,088) and German Offenlegungsschriften (German Published Specifications) Nos. 1,595,687 (U.S. Pat. No. 3,814,095), 1,694,148 (U.S. Pat. No. 3,622,527), 1,729,201 (British Pat. No. 1,175,339) and 1,770,068 (U.S. Pat. No. 3,756,992).

As already mentioned, for the process according to the invention it is possible to use not only dispersions of cationic and anionic polyurethanes but also aqueous dispersions of non-ionic self-emulsifying polyurethanes.

The production of the dispersions of non-ionic polyurethanes containing no emulsifier which are suitable for the process according to the invention is carried out by, for example, the process in DE-OS (German Published Specification) No. 2,141,807:

1 mole of a trifunctional polyether-polyol is reacted with 3 moles of diisocyanate. The resulting adduct containing isocyanate groups is reacted with a mixture of
(a) a monofunctional low molecular weight alcohol and
(b) a reaction product of a monofunctional alcohol or a monocarboxylic acid and ethylene oxide (molecular weight about 600)

in such a manner that a prepolymer which contains one mole of the monofunctional polyethylene oxide adduct to about 3,000 molecular weight units is produced. With the aid of mechanical dispersing devices, this prepolymer is emulsified to form a latex in water, which is subjected to the final polymerization by reaction with water or another chain-lengthening agent known from polyurethane chemistry.

Dispersions of self-dispersing, non-ionic polyurethanes, which can be used in the process according to the invention, can also be produced, according to German Offenlegungsschriften (German Published Specifications) Nos. 2,314,512, 2,314,513 and 2,320,719, by incorporating lateral polyethylene oxide units, which are bonded via allophanate or biuret groups, into linear polyurethanes.

The preparation of these polyurethanes which undergo self-dispersion in water is carried out by methods of polyurethane chemistry which are known per se, by reacting difunctional organic compounds of the molecular weight range 500–6,000, preferably 600–3,000, which have terminal groups which are reactive toward isocyanate groups in the sense of the isocyanate polyaddition reaction, with organic diisocyanates and, where appropriate, the difunctional chain-lengthening agents having a molecular weight below 500 which are known per se in polyurethane chemistry. In this reaction, it is essential to use (also) organic diisocyanates of the general formula

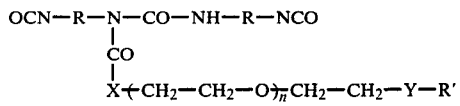

in which
R represents an organic radical as is obtained by removing the isocyanate groups from an organic diisocyanate of the molecular weight range 112–1,000,
R' represents a univalent hydrocarbon radical having 1–12 carbon atoms,
X and Y represent identical or different radicals and represent oxygen or a radical of the formula —N(R")—, R" representing a univalent hydrocarbon radical having 1–12 carbon atoms, and
n denotes an integer from 9 to 89.

These special diisocyanates are preferably employed mixed with non-modified diisocyanates of the general formula R(NCO)$_2$, it being necessary for the mixtures of diisocyanates to be used to contain 5–100, preferably 10–50, mole-% of modified diisocyanates.

It is also possible to obtain dispersions of selfdispersing, non-ionic polyurethanes by introducing polyethylene oxide side-chains via the diol components. Apart from the abovementioned relatively high molecular weight diols, diisocyanates of the formula R(NCO)$_2$ and, where appropriate, chain-lengthening agents, diols of the general formula

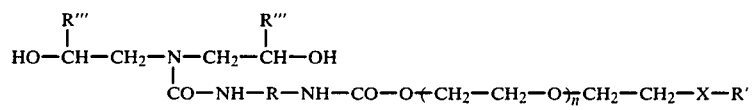

are also used in this process, in which
R represents a divalent radical as is obtained by removing the isocyanate groups from a diisocyanate of molecular weight 112–1,000,
X represents oxygen or —NR"—,
R' and R" are identical or different and represent univalent hydrocarbon radicals having 1–12 carbon atoms,
R'" represents hydrogen or a univalent hydrocarbon radical having 1–8 carbon atoms, and
n denotes an integer from 4 to 89.

It is also possible to use in the process according to the invention dispersions which have been produced with the aid of emulsifiers. Products of this type are described in, for example, DAS (German Published Specification) No. 1,097,673 and in an article by S. P. Suskind in Journal of Applied Polymer Science, 9 (1965), pages 2451–2458.

In the process according to the invention, aqueous dispersions of polyurethanes which have been modified by ionic and non-ionic-hydrophilic groups are preferably used. By this combination, in an advantageous manner, adequate electrolyte stability is achieved even in the absence of alcohols. The production of this type of dispersions of polyurethanes is likewise known per se and described in, for example, DE-OS (German Published Specifications) Nos. 2,551,094, 2,651,506 and 2,651,505. It is also possible to use aqueous polymer latices which do not tend to coagulate as an additive to the aqueous dispersions of polyurethanes, for example dispersions of acrylates and dispersions of polyvinyl acetate.

In general, the procedure for the preparation of the ionic/non-ionic-hydrophilic polyurethanes is such that, to build up the high molecular weight polyurethanes, bifunctional linear polyethers or polyesters having a molecular weight of about 400–10,000 are reacted with diisocyanates in the presence of non-ionic-hydrophilic modifying components and, where appropriate, chain-lengthening agents and ionic hydrophilic components of the type discussed above to give prepolymers which, following this, are reacted, usually in a solvent, preferably acetone, with a chain-lengthening agent, such as diamines and/or hydrazine or, where appropriate, their alkimines, ketimines or aldazines or ketazines, to give a high molecular weight polyurethane. Subsequently, the solution of the high molecular weight polyurethane in acetone is mixed with water and the acetone is removed by distillation. It is also possible, particularly when using the so-called ketimine process, to produce the aqueous dispersions of polyurethanes by the melt dispersion process.

The introduction of the ionic groups or the groups which can be converted into ionic groups into the ionic non-ionic hydrophilic polyurethanes which are preferred according to the invention likewise takes place in a manner known per se by also using compounds having ionic groups or groups which can be converted into ionic groups, these compounds also containing isocyanate groups or, preferably, groups which are reactive toward isocyanate groups, such as, in particular, alcoholic hydroxyl groups, as are described above in detail. If it is desired to introduce free carboxyl groups as the potential anionic groups, it is advisable also to use compounds which have, in addition to free carboxyl groups, groups which are more reactive toward isocyanate groups, in particular hydroxyl groups. A typical example of one of this type of structural component is dimethylolpropionic acid which, at room temperature or moderately elevated temperature, reacts completely with organic polyisocyanates, selectively and with exclusive formation of urethane groups and retention of the free carboxyl group.

The ethylene oxide units, which are incorporated within polyether chains and are present in the polyurethanes which are preferably to be used according to the invention as elasticators, are preferably introduced by also using alcohols which contain lateral or terminal ethylene oxide units, and/or by also using diisocyanates having this type of polyalkylene side chains, in the preparation of the polyurethanes. These types of structural components having polyalkylene oxide chains containing ethylene oxide units are described in, for example, DE-OS (German Published Specification) Nos. 2,314,512, 2,651,506, 2,314,513, U.S. Pat. Nos. 3,920,598 and 3,905,929, some of which have already been mentioned above.

A further possibility for the introduction of ethylene oxide units comprises also using polyether-polyols which have an appropriate number of units of this type.

The hydrophilic or potentially hydrophilic structural components which have been mentioned as examples are used in the preparation of the polyurethanes to be used according to the invention in amounts such that the dispersibility in water is ensured. As already mentioned, for this purpose it is possible to incorporate not only ionic but potentially ionic and also non-ionic hydrophilic groups of the type mentioned as an example, as well as, preferably, both types of hydrophilic groups at once. The content of the hydrophilic groups mentioned in the polyurethanes to be used according to the invention is, when ionic groups or groups which can be converted into ionic groups are used alone as the hydrophilic groups, preferably 30 to 130 milliequivalents of such groups per 100 g of solid polyurethane, or, when ethylene oxide units are used alone as the hydrophilic groups, as a rule 2 to 20% by weight, preferably 8 to 16% by weight, of ethylene oxide units incorporated within polyether chains. If both types of hydrophilic groups are present, preferably 0.1 to 40 milliequivalents of ionic groups or groups which can be converted into ionic groups are present per 100 g and, at the same time, 0.5–10% by weight of polyethylene oxide units incorporated within polyether chains are present in the polyurethanes.

If the dispersibility of the polyurethanes is partly or completely ensured by incorporating potentially ionic groups, care must of course be taken that, before or during the process of dispersing the polyurethanes, at least some of the potentially ionic groups are converted into ionic groups so that the content of ionic groups in the polyurethanes existing as dispersions comply with the abovementioned conditions. Strictly speaking, this type of polyurethanes, the dispersibility of which is partly or completely ensured by the presence of potentially ionic groups, is of course not dispersible in water but only in water which contains an appropriate neutralizing agent.

As already mentioned, the polyurethanes which have both ionic and non-ionic hydrophilic groups and are preferably to be used according to the invention have, as do purely non-ionic polyurethanes, the advantage that their dispersions in water are sufficiently stable to electrolytes, that is to say they do not coagulate in contact with calcined gypsum. However, when using polyurethanes which have been made dispersible in water only by incorporating ionic groups, it is as a rule necessary, in order to avoid coagulation of the polyurethane, also to use in the mixture up to 20% by weight, preferably 1 to 10% by weight, (relative to the total mixture) of at least one water-soluble alcohol, such as, for example, methanol, ethanol, propanol, t-butanol, glycerol, formose, formitol or polyvinyl alcohol powder (preferably ethanol). In addition, the mixture can contain up to 20% by weight of other organic solvents (for example originating from the production of the dispersions of the polyurethanes), for example acetone, methyl ethyl ketone, dimethylformamide or N-methylpyrrolidone. However, care has to be taken that these types of organic solvents, just as the volatile alcohols which, where appropriate, are also used, are able to escape during the setting process, since otherwise the set composite material has but inadequate mechanical stability.

According to a preferred embodiment of the process according to the invention, the hydrophilic polyurethane (for example in the form of the commercially customary aqueous dispersion containing about 40–50% by weight of solids, or at a lower concentration after dilution with water) is mixed, where appropriate with the addition of alcohol, with calcined gypsum and poured into a mold. The inorganic-organic composite material according to the invention is produced after setting. The models produced in this manner, for example models of teeth in dental laboratories, can be filed, worked with a knife, ground, sawed drilled, lacquered and metallized. They are not combustible. On treatment with water, the materials absorb up to 20% by weight of $H_2O$, and this is completely lost again on drying in air. On storage in water, the materials retain their stability. An article molded of gypsum which undergoes comparable storage in water disintegrates when subjected to the slightest mechanical stress.

For the production of fixed dressings for medical use, commercially available plaster bandages are preferably impregnated with an aqueous dispersion of polyurethanes and processed by conventional techniques. The good resistance to water of the fixed plaster dressings modified with polyurethane again emerges from a simple experiment. If a plaster bandage is immersed in an aqueous dispersion containing 5% by weight of polyurethane-urea, and a fixed dressing about 0.5 cm thick is wound about a pasteboard core, allowed to set and the sample polyurethane-gypsum fixed dressing is placed, together with a plaster dressing which is not modified with polyurethane, in a bowl of water, the water level of which is at 12 mm, it emerges that, due to capillary action, the water has been sucked up to a height of 72 mm on the conventional plaster dressing after 3 h, while the water has risen to a height of only 16 mm on the polyurethane-plaster fixed dressing.

Moreover, polyurethane-gypsum composite materials are suitable in construction applications for the production of panels, permanently elastic joint-sealing compositions and water-resistant exterior plastering applications.

It is also possible to add fillers and dyestuffs. Examples of suitable fillers are: up to 10% by weight (relative to the total mixture) of other aqueous polymer latices, kieselguhr, pumice powder, carbon black, prepared chalk, slate flour, glass wool and aluminum powder, silicaceous materials such as clay, aluminosilicates, kaolins and finely divided mica, glass fibers, cotton fibers, polyamide and polyacrylonitrile fibres, cellulose fibers, polyester fibers, wood dust, cotton linters, polymethylene-ureas, titanium dioxide, aluminum oxide hydrate, finely divided lead, lead oxides, iron oxides and azulmic acid, starch and paper, especially shredded waste paper. Examples of suitable dyestuffs are: azo dyestuffs, anthraquinone dyestuffs, pigment dyestuffs, phthalocyanine dyestuffs, optical brighteners, and fluorescent and luminescent dyestuffs.

Thus, for example from a mixture of calcined gypsum, shredded waste paper and an aqueous dispersion of polyurethanes, optionally with the addition of ethanol, fiber-reinforced gypsum panels with excellent stability are produced. The fiber-reinforced panels are resistant to changes in dimensions, are flexible, resistant to water, and can be nailed and mechanically worked and, in spite of the organic constituents, polyurethane and paper, are not flammable.

However, in construction applications, it is also possible for the elasticated, water-resistant fiber-reinforced gypsum-polyurethane panels to be attached with adhesive or to be given tiled, veneer or plastic surfaces. In addition, they have excellent heat-insulating properties.

It is to be regarded as being extremely surprising that homogeneous inorganic-organic composite materials are produced when aqueous dispersions of polyurethanes and calcined gypsum are used according to the invention, these materials having considerably improved properties, such as, for example, resistance to water and resistance to breakage, since analogous improvements in properties do not occur when, for example, $CaSO_4.2H_2O$, which is known per se, is used as a filler even for polyurethanes (compare Vieweg-Höchtlen, Carl-Hanser-Verlag, Munich 1966, Kunststoffhandbuch (Plastics Handbook) Volume 8, page 112, Fillers). When, for the purpose of comparison, aqueous dispersions of polyurethane and hydrated gypsum, that is to say $CaSO_4.2H_2O$, are used for producing the composite materials, and the water is allowed to evaporate, then the material obtained has resistance to breakage which is considerably poorer than that of unfilled polyurethane and is inhomogeneous because of the content of filler but is not an inorganic-organic composite material (compare Examples 1 and 2 below).

The same negative result is obtained when $CaSO_4.0.5H_2O$ is added to the solution of a polyurethane-polyurea film, which has excellent properties, in toluene isopropanol (prepared by the method of German Patent Specification No. 2,644,434) and the amount of water in ethanol is added which is necessary for setting the gypsum. The mixture is initially homogeneous; but after evaporation of the solvents, a friable, inhomogeneous polyurethane-gypsum composition without any mechanical stability is produced.

The use according to the invention of ethanol or other alcohols for controlling the setting times of the polyurethane-gypsum composite materials is likewise extremely surprising. But, on mixing 100 g of $CaSO_4.0.5H_2O$ with 100 g of a 50% strength aqueous dispersion of polyurethane-urea, which contains $SO_3$ groups and polyether end groups, prepared by the method of DE-OS (German Published Specification) No. 2,651,506, and 20 ml of ethanol, a homogeneous mixture is obtained, which sets within 15 minutes after pouring out on to a sheet of Teflon. The composite material reaches its final properties in respect of resistance to breakage and water after 2 days. In contrast, if 100 g of $CaSO_4.0.5H_2O$ are mixed with 100 g of the 50% strength dispersion described above, without adding ethanol, then the composite material sets after only 3 minutes, similar to pure gypsum. The composite material thus produced has, after 2 days, final properties which are not quite as good as those of a sample panel whose setting has been retarded by ethanol.

Moreover, the following experiments show just how surprising, compared with other aqueous dispersions of organic polymers, is the use according to the invention of aqueous dispersions of polyurethanes for the production of inorganic/organic composite materials:

Commercially available aqueous dispersions of acrylate, for example Impranil ® AW and Impranil ® AM (commercial products of BAYER AG) can certainly be compounded with $CaSO_4.0.5H_2O$, but the setting of the gypsum is prevented and the resulting compositions resemble curds. Elastication of gypsum is not possible by this means. It is equally impossible to use aqueous rubber latices (for example Baypren ®) to elasticate gypsum. In these experiments, the particles of rubber dispersed in water were immediately coagulated by the addition of gypsum; mixing with gypsum is quite impossible.

EXAMPLES

Unless expressly indicated otherwise, the types of gypsum used in the examples are calcined gypsum of chemical composition $CaSO_4.0.5 H_2O$ (calcined calcium sulphate, extra pure, DAB 8, BPC 1983, Ph. Belg. IV, F VII, Helv. V, commercial products supplied by E. Merck, Darmstadt). This gypsum is intended to be representative of all the other possible commercially available types of gypsum. In principle, the results may also be applied to so-called anhydrite, $CaSO_4$, even though its setting times are considerably longer.

The setting times of the various types of gypsum differ considerably depending on the additive:

|   | Setting time |
|---|---|
| A. 50 g $CaSO_4.0.5H_2O$ + 30 g $H_2O$ | about 5 min. |

-continued

| | Setting time |
|---|---|
| B. 50 g Silogips ® + 30 g H₂O (α-gypsum) | about 30 min. |
| C. 50 g Supraduro ® + 30 g H₂O (β-gypsum) | about 35 min. |
| D. 50 g plaster of Paris + 30 g H₂O (DIN 1168) | about 30 min. |
| E. 50 g Moldano ® + 30 g H₂O (dental plaster) | about 10 min. |
| F. 50 g Moldaroc ® + 30 g H₂O (dental plaster) | about 16 min. |

B, C, E and F = commercial products of BAYER AG

Reviews of the wide variety of types of gypsum are to be found, for example, in Karl Eichner, Zahnärztliche Werkstoffe und ihre Verarbeitung (Dental Materials and their Processing), 3rd Edition, 1974, pages 7-21, Dr. Alfred Hüthig Verlag, Heidelberg, and in H. Römpp, Chemielexikon (Lexicon of Chemistry) 907-910, 342-344, Franckh'sche Verlagshandlung Stuttgart, 1966.

The aqueous dispersion of polyurethane(-urea)s used for modification in the Examples 1 to 12 which follow was produced by the method of Example 1 in DE-OS (German Published Specification) No. 2,651,506. The dispersion contains 50% solids and about 3% by weight of polyethylene oxide segments and 3 milliequivalents of sulphonate groups per 100 g of solid.

COMPARISON EXAMPLE 1

100 g of finely powdered $CaSO_4.2H_2O$ are mixed with 55 g of $H_2O$, 20 ml of ethanol and 10 g of the 50% strength aqueous dispersion of polyurethane(-urea) and poured on to a sheet of Teflon. After drying overnight, the white composition, which is initially homogeneous, disintegrates by the formation of cracks into small, inhomogeneous pieces. No composite material of polyurethane and gypsum is produced.

COMPARISON EXAMPLE 2

50 g of $CaSO_4.0.5H_2O$ are mixed with 30 ml of $H_2O$ and dried at room temperature under atmospheric pressure. After setting (5 min) and drying (3 days), the gypsum weighs 59.3 g; this corresponds to the chemical composition $CaSO_4.2H_2O$. This gypsum is then broken up and finely milled. Then the fine powder of gypsum is mixed with 50 g of the 50% strength aqueous dispersion of polyurethane-polyurea and 20 ml of ethanol and poured on to a sheet of Teflon. After a few days, a polyurethane-urea which contains filler and has an irregular structure and an irregular surface is produced by evaporation of the water and the ethanol. The properties of the polyurethane are considerably impaired by the dead filler, and a homogeneous PUR-gypsum composite material is not produced.

COMPARISON EXAMPLE 3

(A) 100 g of a 25% strength solution of a polyurethane-polyurea in toluene/isopropanol (7:3), prepared by the method of DE-OS (German Published Specification) No. 2,644,434, are mixed with 5 g of $H_2O$ and 25 ml of ethanol. A clear solution is produced. Then 25 g of $CaSO_4.0.5H_2O$ are added to this solution, and the mixture is thoroughly stirred and poured out. After 2 days, the material produced is friable and inhomogeneous, and a homogeneous composite material is not produced.

(B) 50 g of the 50% strength solution of polyurethane in toluene/isopropanol described above are mixed with 100 g of $CaSO_4.0.5H_2O$. This produces a highly viscous spreadable composition. 20 g of water are added to this composition and, after stirring for a few seconds, they are well distributed in the mixture. The plaster sets after about 6 minutes, and this is noticeable by the evolution of heat which occurs. After storage for one week, the mixture is still friable and disintegrates under the slightest mechanical stress.

COMPARISON EXAMPLE 4

50 g of a 40% strength aqueous dispersion of acrylate Imprani ® AW (commercial product of BAYER AG) are mixed with 50 g of $CaSO_4.0.5H_2O$. A composition resembling curds is produced after several hours, the surface of which dries out but the inside of which does not set.

COMPARISON EXAMPLE 5

50 g of $CaSO_4.0.5H_2O$ are added to 50 g of a 50% strength aqueous dispersion of rubber Baypren ® (commercial product of BAYER AG). The rubber latex coagulates spontaneously.

EXAMPLES ACCORDING TO THE INVENTION

EXAMPLE 6

The components which are mentioned below are mixed and poured on to a sheet of Teflon. The PUR-gypsum composite materials according to the invention are produced, and these are subjected to storage in water after drying in air for 2 days.

| | Stiffening time | Removal time |
|---|---|---|
| (A) 100 g $CaSO_4.0.5H_2O$<br>100 g PUR dispersion | 3 min. | 6 min. |
| (B) 100 g $CaSO_4.0.5H_2O$<br>100 g PUR dispersion + 10 g $H_2O$ | 3 min. | 6 min. |
| (C) 100 g $CaSO_4.0.5H_2O$<br>100 g PUR dispersion<br>20 ml ethanol | 5 min. | 15 min. |
| Comparison: 100 g $CaSO_4.0.5H_2O$,<br>60 g $H_2O$ | 3 min. | 3 min. |

The setting time of C is longest. However, C is considerably more elastic and resistant than A and B even in an experiment bending by hand.

After storage in water (12 h at room temperature), C has the greatest tensile strength. A panel made of standard plaster which has been stored in water for comparison disintegrates under the slightest mechanical stress.

If a test article made of the gypsum-PUR composite material C is weighed before and after storage in water, it is found that the PUR-gypsum composition has absorbed about 20% by weight of water. After storage in air, this test article completely loses the absorbed water again so that, after 2 days, it again has its original weight and its original elasticity.

EXAMPLE 7

A commercially available plaster bandage, brand ZOROC ® supplied by Johnson & Johnson, is impregnated with water in accordance with the manufacturer's instructions and wound on a pasteboard core (10 cm diameter, 13 cm long). On setting, a molded article analogous to the plaster fixed dressings customary in medical applications is produced.

A second commercially available plaster bandage (ZOROC ®) is impregnated with a 5% by weight dispersion of PUR and likewise wound on to a pasteboard core. A PUR-gypsum composite material according to the invention is produced. A third commercially available plaster bandage (ZOROC ®) is impregnated with a 20% by weight dispersion of PUR and likewise wound on to a pasteboard core. A PUR-gypsum composite material according to the invention is produced. In order to test the resistance to water, the three test articles are dried in air for two days and then placed in a bowl containing water (depth of immersion: 12 mm).

The height to which the water has risen is measured after 3 hours:

ness of each test panel is determined. The results are compiled in the table which follows:

| | Mixtures | | | Flexural strength test (DIN 53 452) | | | Shore hardness (DIN 53 505) | | Impact strength (DIN 53 453) |
| | $CaSO_4.0,5\ H_2O$ (g) | $H_2O$ (g) | Pur Disp. (g) | Ethanol (ml) | Flexural strength $\delta_{bB}$ (MPa) | Modulus of rupture $E_b$ (MPa) | Extreme fibre extension $\epsilon_{bB}$ (%) | A | D | $a_n$ (KJ/m$^2$) |
|---|---|---|---|---|---|---|---|---|---|---|
| A | 100 | 60 | 0 | 0 | 6.98 | 5224 | 0.13 | 97 | 67 | 1.3 |
| B | 100 | 60 | 0 | 20 | 3.08 | 3569 | 0.09 | 91 | 45 | 0.8 |
| C | 100 | 65 | 0 | 0 | 6.25 | 4406 | 0.14 | 97 | 66 | 1.1 |
| D | 100 | 55 | 20 | 20 | 2.67 | 1589 | 0.19 | 90 | 33 | 1.2 |
| E | 100 | 50 | 30 | 20 | 2.82 | 1392 | 0.26 | 88 | 30 | 2.8 |
| F | 100 | 30 | 70 | 20 | 2.39 | 879 | 0.52 | 88 | 31 | 5.9 |
| G | 100 | 25 | 80 | 20 | 2.50 | 754 | 0.78 | 87 | 27 | 7.0 |
| H | 100 | 20 | 90 | 20 | 2.55 | 561 | 1.68 | 87 | 27 | 8.2 |
| J | 100 | 15 | 100 | 20 | 2.65 | 549 | 1.91 | 83 | 25 | * |
| K | 100 | 0 | 130 | 0 | 2.35 | 351 | 4.01 | 79 | 21 | * |
| L | 100 | 0 | 130 | 20 | 2.61 | 331 | 6.13 | 82 | 25 | * |

*not broken

| % PUR | 0 | 5 | 20 |
|---|---|---|---|
| Height (mm) to which the water has risen by capillary action after 3 hours | 72 | 23 | 16 |

EXAMPLE 8

(A) 20 g of newspaper are shredded in 60 g of water and stirred to form a paste together with 100 g of 50% strength dispersion of PUR and 100 g of plaster of Paris, and filled into a mold (180×180×4 mm). After setting and drying, a solid, flexible fiber-reinforced gypsum panel which does not chalk, is produced.

(B) 20 g of shredded newspaper, 110 g of water and 100 g of plaster of Paris are stirred to form a paste and filled into a mold (180×180×4 mm). The gypsum sets after 30 minutes. After storage for 2 days, a light paper fiber-reinforced gypsum panel, which is of low solidity and chalks extensively, is obtained.

One test article of each of the fiber-reinforced gypsum panels (A) and (B) are stored in water for 16 hours. After this time, test article (B) disintegrates under the slightest mechanical stress with a glass rod, while (A) has excellent solidity.

EXAMPLE 9

100 g samples of $CaSO_4.0.5\ H_2O$ are mixed with various amounts of water, ethanol and a 50% strength dispersion of PUR, poured into an aluminum mold (180×180×4 mm) and allowed to set. After removal, the test panels are stored for 1 week. Samples with the dimensions 120×15×4±0.5 mm are removed from the test panels using a diamond cutter and then subjected to the flexural strength test (DIN 53,452) and the impact strength test (DIN 53,453). In addition the Shore hardness of each test panel is determined. The results are compiled in the table which follows:

It is clear from tests C to L that the PUR-gypsum composite materials possess elastomer characteristics with increasing amounts of PUR. The advantageous effect of also using ethanol is shown clearly by tests K and L. While the extreme fiber extension is 4.01% in test K, it increases to 6.13% in test L. Moreover, the impact strength of the PUR-gypsum composite materials increases drastically with increasing content of PUR. Gypsum-PUR composite materials according to J, K and L do not break under the conditions of the impact strength test of DIN 53,453.

EXAMPLE 10 (Use: joint filler)

50 g of plaster of Paris and 50 g of the 50% strength aqueous dispersion of polyurethane-polyurea are vigourously mixed for about 1 minute. This composition is used to fill the point of contact of two rigid gypsum panels fixed to butt. After drying and setting, the panels are fixed together in a manner which is smooth, permanently elastic and water-resistant.

EXAMPLE 11 (Use: water-resistant plaster)

(A) 50 g of plaster of Paris are mixed with 25 g of water and spread as plaster onto a stone panel.

(B) 50 g of plaster of Paris are mixed with 50 g of the 50% strength aqueous dispersion of PUR and likewise spread as plaster onto a stone panel.

After 3 days, the two test panels A and B are placed in a bowl filled with water, the water level being at 20 mm.

After storage in water for 1 hour, the water has risen by suction up to a level of 80 mm of plaster A, while the water has merely been sucked to 10 mm on plaster B.

Plaster B is a PUR-gypsum composite material which is insensitive to impact, has dimensional stability, is resistant to water and adheres excellently to masonry.

EXAMPLE 12 (Use: impression composition)

50 g of $CaSO_4.0.5H_2O$ and 50 g of dispersion of PUR are vigourously stirred for 1 minute. The mixture is then placed in a casting ladle and excess material is smoothed off the top. A hexagonal glass stopper is pressed into the composition. After 10 minutes, the glass stopper can be removed after brief lateral movement. A sharp-edged, elasticated impression with dimensional stability remains.

EXAMPLE 13

50 g of $CaSO_4.0.5H_2O$, 50 g of an aqueous dispersion containing 40% by weight of a polyurethane-urea and 4% by weight of N-methylpyrrolidone according to Example 2 in DOS (German Published Specification) No. 3,134,161 (containing 19 milliequivalents of sulphamate groups per 100 g of solids) and 10 ml of ethanol are mixed. After 3 days, a water-resistant, elastic PUR-gypsum composite material has been produced.

EXAMPLE 14

An aqueous dispersion of PUR which contains 38% by weight of PUR solid and 10% by weight of N-methylpyrrolidone is produced by reacting 4,4'-dicyclohexylmethane diisocyanate, adipic acid-hexanediol polyester (molecular weight: 840), hydrazine and the triethylamine salt of dimethylolpropionic acid by the general process described in DOS (German Published Specification) No. 2,811,148. The PUR solid contains 1.6% by weight of carboxylate groups.

50 g of $CaSO_4.0.5H_2O$, 50 g of the dispersion of PUR and 10 ml of ethanol are mixed. After 3 days, a water-resistant, elastic gypsum-PUR composite material has been produced.

EXAMPLE 15

An aqueous dispersion of cationic PUR is produced by reaction of toluylene diisocyanate (T 65), adipic acid-phthalic acid-ethylene glycol polyester (molecular weight: 1,750) and N-methyldiethanolamine, followed by quaternization with $H_3PO_4$, by the general process described in German Patent Specification Nos. 1,495,847 and 1,770,068.

The dispersion of PUR contains 28.6% by weight of solids, 39.9% by weight of water and 31.3% by weight of DMF. The PUR solid contains 0.8% by weight of quaternary nitrogen.

50 g of $CaSO_4.0.5H_2O$, 50 g of the dispersion of PUR and 10 ml of ethanol are mixed. After storage for 2 days, a homogeneous, water-resistant gypsum-PUR composite material has been produced.

It will be appreciated that the instant specification and examples are set forth by way of illustration and not limitation, and that various modifications and changes may be made without departing from the spirit and scope of the present invention.

We claim:

1. A process for producing an inorganic-organic fixed dressings based on gypsum and polyurethane comprising contacting a textile support carrying calcined gypsum or anhydrite with an aqueous dispersion of a polyurethane or polyurethane-urea which dispersion contains up to about 20% by weight (relative to the total mixture) of an alcohol and up to about 20% by weight (relative to the total mixture) of another organic solvent, each 100 grams of polyurethane or polyurethane-urea having about 0.1–130 milli-equivalents of ionic groups or of groups which can be converted into ionic groups, and allowing the composition to set while permitting any solvents which may be present to evaporate.

2. A process according to claim 1, wherein the polyurethane or polyurethane-urea is present in about 1 to 50% by weight of polyurethane or polyurethane-urea plus gypsum.

3. A process according to claim 1, wherein the polyurethane or polyurethane-urea is present in about 5 45% by weight of polyurethane or polyurethane-urea plus gypsum.

4. A process according to claim 1, hwerein the aqueous dispersion has a polyurethane or polyurethane-urea content of about 1 to 60% by weight.

5. A process according to claim 1, wherein the aqueous dispersion has a polyurethane or polyurethane-urea content of about 5 to 50% by weight.

6. A process according to claim 1, wherein the polyurethane or polyurethane-urea is one which on drying out forms a non-adhesive film having an indentation hardness below about 1,400 $Kp/cm^2$.

7. A process according to claim 1, wherein about 2 to 20% by weight of the polyurethane or polyurethane-urea comprises ethylene oxide units in polyether chains.

8. A process according to claim 1, wherein about 8 to 16% by weight of the polyurethane or polyurethane-urea comprises ethylene oxide units in polyether chains.

9. A process according to claim 1, wherein the gypsum is present in about twice the weight of a polyurethane.

10. A process according to claim 1, wherein the gypsum is present in about twice the weight of a polyurethane-urea.

11. A process according to claim 1, wherein the gypsum is present in about equal weight of a polyurethane.

12. A process according to claim 1, wherein about 0.5 to 10% by weight of the polyurethane or polyurethane-urea ccmprises ethylene oxide units in polyether chains, and wherein each 100 grams of polyurethane or polyurethane-urea has about 0.1 to 40 milliequivalents of ionic groups or of groups which can be converted into ionic groups.

13. A product produced by the process of claim 1.

14. A product produced by the process of claim 6.

* * * * *